June 30, 1970   L. T. SKEGGS   3,518,008
FLOW CELL DEVICE
Filed June 10, 1966

INVENTOR.
LEONARD T. STEGGS
BY

United States Patent Office 3,518,008
Patented June 30, 1970

3,518,008
FLOW CELL DEVICE
Leonard T. Skeggs, Kirtland, Ohio, assignor to Technicon Corporation, a corporation of New York
Filed June 10, 1966, Ser. No. 556,749
Int. Cl. G01j 3/46; G01n 21/06, 1/10
U.S. Cl. 356—181                                15 Claims

ABSTRACT OF THE DISCLOSURE

A colorimeter flow cell device includes a viewing chamber in close fluid-flow communication with a passage along which a stream of liquid samples to be analyzed is directed. The liquid samples in the stream are separated by segments of a fluid having a different specific gravity than the samples. The viewing chamber and passage are formed in a single member and positioned such that only portions of the liquid samples flow through the viewing chamber and the light path through the viewing chamber is remote from the passage.

---

This invention relates to automatic analysis apparatus and, more particularly, to such apparatus which includes a colorimeter flow cell device for the quantitative colorimetric analysis of a liquid stream in respect to an ingredient thereof. Such apparatus is shown and described in my U.S. Pats. Nos. 2,797,149, 2,879,141 and 3,241,432, among others, owned by the assignee of the present application. The apparatus may be used for the chemical analysis of a stream of a series of individual clinical or industrial samples, or for monitoring a continuous sample-liquid stream, for example but without limitation, in an industrial plant to monitor a manufacturing process, a waste stream, etc.

As explained in the above mentioned patents, air is introduced into the liquid streams to divide them into a series of successive small segments separated from each other by intervening air segments or bubbles which serve to cleanse the internal walls of the passages. Where a series of samples are being analyzed, air is also introduced between successive samples of the liquids to separate the samples from each other and to provide a cleansing action of the passages between successive samples in order to prevent contamination of one sample by another, which might otherwise occur due to the fact that the samples are introduced into the passages in series one after the other in a flowing stream. At a predetermined stage in the operation of the apparatus it is desirable to debubble the liquid stream, i.e., to abstract the previously introduced air or other segmentizing fluid prior to the viewing of the liquid during its flow through the flow cell of the colorimeter. Means for accomplishing this are shown in various patents of my assignee, including my U.S. Pat. No. 3,109,714, U.S. Pat. No. 3,109,713 to Andres Ferrari, and U.S. Pat. No. 3,236,602 to Jack Isreeli. In the case of the use of a liquid as the segmentizing fluid, the method shown and described in the U.S. Pat. No. 3,047,367 to Gerald Kessler has been used for abstracting the segmentizing liquid.

In order to increase the rate of sample-analyses it has been proposed heretofore to omit the operation of abstracting the segmentizing fluid, including the fluid introduced between samples, before transmitting the liquid under analysis through the flow cell of the colorimeter, and to transmit the stream of liquid under analysis and said other fluids through the flow cell, with provision for interrupting the recorder-controlling operations of the photoelectric detector cell of the colorimeter during the passage of segmentizing fluid through the flow cell. It has also been proposed to eliminate, substantially or entirely, the intrasegmentation of the liquids under analysis and to transmit the sample liquids with only, or substantially only, inter, i.e., between-sample segmentation, through the flow cell.

The primary object of my present invention is to increase the rate of sample analyses while retaining the above indicated advantages of both intra and inter segmentation of the liquids under analysis.

Another important object, helpful to the achievement of the primary object, is the provision of a flow cell with an integrated debubbler.

In accordance with the present invention, the above mentioned objects are achieved by providing a colorimeter flow cell device which comprises means having a passage for the flow therein of a stream of fluid comprising segments of at least one fluid separated in the stream by segments of a fluid having a specific gravity which is lower than the specific gravity of said one fluid, said passage having an inlet and an outlet and an intermediate opening between said inlet and said outlet, and a flow-through viewing chamber positioned below said passage and having an inlet in close fluid-flow communication with said opening whereby at least some of said fluid of higher specific gravity flows through said opening directly into said viewing chamber and flows therethrough while the liquid of lower specific gravity passes said opening and flows out of said passage through said outlet, said viewing chamber having a light entrance and a light outlet for the passage of light through the flowing fluid in said viewing chamber.

A further object is to provide a flow cell which operates with decreased light-loss and with increase of the effective length of the light path through the liquid flowing through the viewing camber. This object is achieved by the provision of a flow cell which has a flow-through viewing chamber comprising a peripheral wall which is opaque and has a highly polished inner surface whereby light which enters the viewing chamber is reflected by said inner surface a plurality of times transversely of the fluid in the fluid path, thereby providing an effective light path of considerable length in excess of the fluid flow path.

The above objects, and other objects, features and advantages of the present invention which might hereinafter appear, will be more fully understood from the following description of the presently preferred embodiment of the invention considered in connection with the accompanying illustrative drawings. In the drawings.

Figure 3:
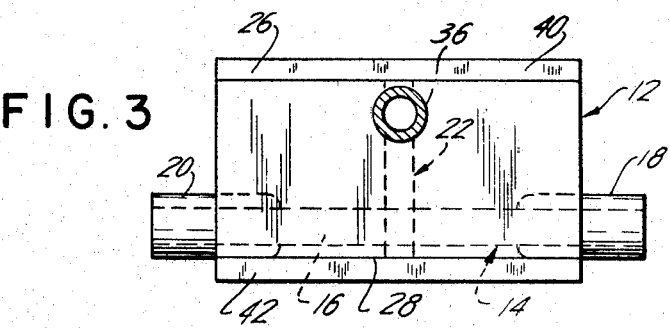
FIG. 3 is a top plan view thereof.

Referring now to the drawings in detail, the flow cell device, indicated generally by the numeral 10, comprises a block 12 of opaque material, for example, black glass, metal which is inert to the fluids involved in the use of the device, black polymerized methyl methacrylate, etc. Said block is provided with a passage 14 which includes a bore 16. Glass inlet and outlet tubes 18 and 20, respectively, are cemented into the block and extend outwardly therefrom at the opposite ends of the block in communication with bore 16 as continuations thereof.

A viewing chamber 22 providing a flow-through flow cell is positioned below passage 14. Viewing chamber 22 comprises a bore 24 which extends from one side 26 of block 12 to the opposite side 28 thereof and is in fluid flow communication at its inlet end portion 30 with bore 16 adjacent side 26 of block 12. The opposite end portion 32 of bore 24 adjacent side 28 of the block communicates with the lower end of an upwardly extending passage which comprises a bore 34 in block 12 and a glass tube 36 is cemented into said block, adjacent the top 38, and is in fluid flow communication with bore 34. It will be understood that glass tubes 18, 20 and 36 constitute nipples for the connection of tubing thereto.

Glass plates 40 and 42 are cemented to the sides 26 and 28, respectively, of block 12 for the passage of light from a light source 44 (FIG. 4) to the photoelectric detector cell 46 which controls the operation of a recorder 48 for providing records of the light transmission characteristics of the treated liquids under analysis. Said glass plates are transparent at least in the portions which register with the opposite ends of bore 24 in light-passage communication with said bore. The light source 44 includes an electric lamp 50, focusing lenses 52, and an optical light filter 54 for transmitting light of the appropriate wave length to the flow cell, as will be readily understood. The light enters the viewing chamber 22 at the side 26 of block 12 and exits at the side 28 after passing through the liquid which flows through said viewing chamber.

The inner peripheral surface of viewing chamber 22 is highly polished and is, therefore, highly light reflective. Thus, the light is reflected a number of times from said surface transversely of said chamber through liquid which flows through the viewing chamber, probably with little or no refracted light passage through the portion of block 12 which surround the bore 24 of the viewing chamber. Accordingly, the effective length of the light path through the liquid which flows through the viewing chamber is considerably increased by the high light-reflective characteristic of the inner surface of bore 24.

Figure 2:
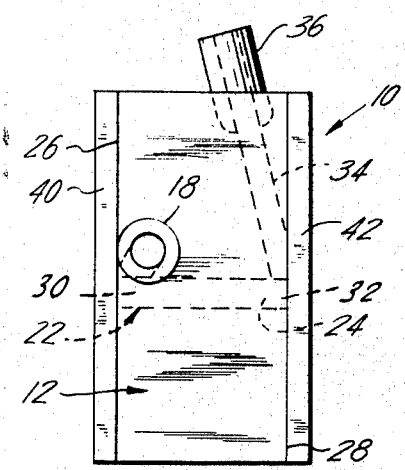
FIG. 2 is an elevational end view thereof.
Figure 1:
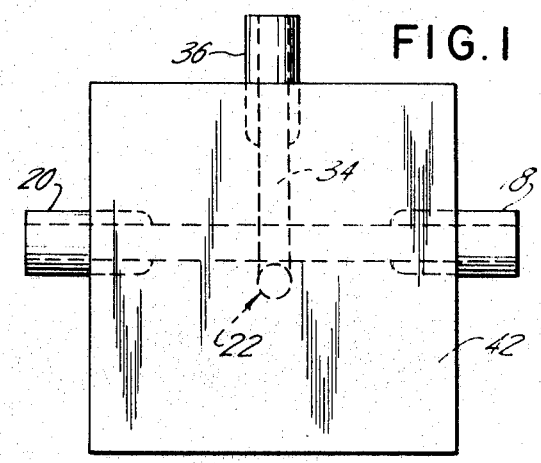
FIG. 1 is a side view, in elevation, of colorimeter flow cell in accordance with the invention.

It will be understood that the air or other gas which is inert to the liquid stream is transmitted with said liquid, in the form of a segmented liquid stream as described in my above-mentioned Pat. No. 3,109,714, to inlet 18 of passage 14. As the stream passes the inlet 30 of the viewing chamber 22, segments of liquid flow into said viewing chamber while all or substantially all of the air or gas bubbles, being lighter than liquid, continue to flow past inlet 30 to the outlet 20 of the flow cell. As the liquid segments enter the viewing chamber, they consolidate into a non-segmented liquid stream, the inner diameter of bore 24 being sufficiently smaller than the inner diameter of bore 16 to effect this result. The liquid stream is exhausted from viewing chamber 22 at its outlet end 32 by aspirating said liquid upwardly through bore 34. It will be understood that liquid which does not pass from the passage 14 into the viewing chamber will flow along with the air bubbles through outlet 20 to waste. If any vestige of air is present in viewing chamber 22, such minute quantity of air will flow in the upper part of bore 24 and will not interfere with the passage of light from the light entrance to the light exit of the viewing chamber. This action is enhanced by tilting block 12 in a counterclockwise direction about ten degrees, viewing FIG. 2.

Flow cell 10 is of small size. For example, but without limitation, the block 12 is one inch square at its sides 26 and 28, and one-half inch wide at its top 38 and at its parallel bottom; the inner diameter of the viewing chamber is 0.062" and its length is 0.5"; the inner diameter of passage 14 is 0.094" and its length is one inch from the inlet nipple 18 to the outlet nipple 20.

Figure 4:
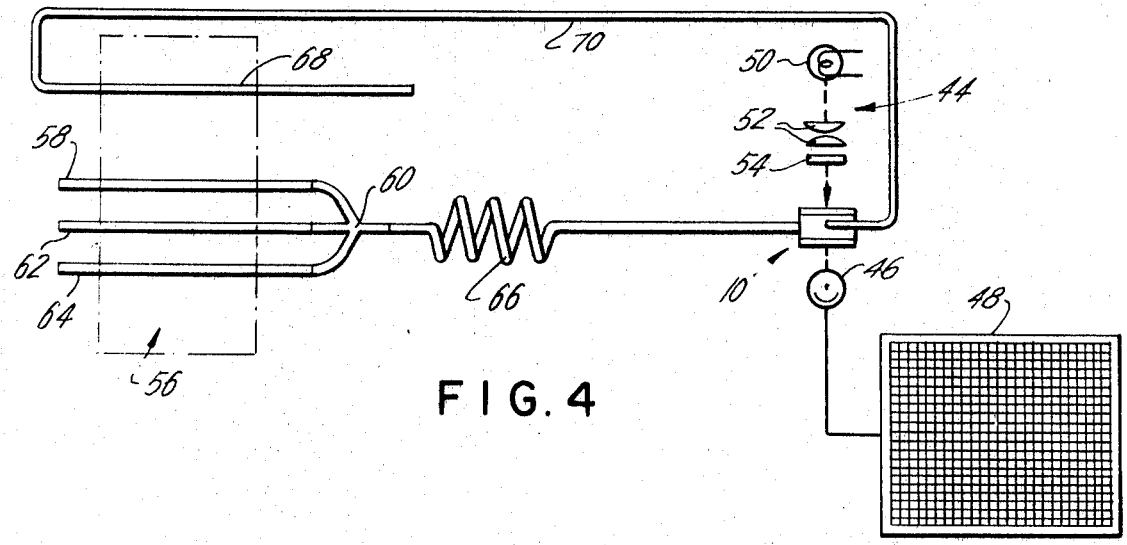
FIG. 4 is a more or less diagrammatic view of an apparatus for the colorimetric treatment and examination of a liquid stream, including a flow cell of the invention.

Referring now in more detail to FIG. 4, there is shown a colorimetric analysis apparatus of the type shown in my above-mentioned U.S. Pats. 2,797,149 and 2,879,141 and which utilizes the flow cell of the present invention. The analysis apparatus comprises a proportioning pump schematically illustrated at 56. Said pump may be of any suitable type though it is preferably of the type described in U.S. Pat. No. 2,935,028 issued May 3, 1960. Briefly described, the pump comprises a plurality of resiliently flexible pump tubes which are compressed along their lengths during the pumping operation by the engagement therewith of a plurality of pressure rollers. The rollers move longitudinally of the pump tubes to fully close the tubes progressively along their lengths against a platen and thus propel the liquids or other fluids for transmitting them from sources of supply to points of delivery. The liquid samples which are to be treated for colorimetric analysis are transmitted one after the other from an automatic sampler, preferably of the type shown by the U.S. Pat. No. 3,038,340 to Jack Isreeli to and through a pump tube 58 to a fitting 60 where the samples join a stream of air or other inert gas and a stream of a color producing reagent is simultaneously transmitted through pump tubes 62 and 64, respectively. The fluids join each other in fitting 60 and form a segmented stream consisting of a series of liquid segments, each containing a portion of the liquid sample and a portion of the color reagent, separated from each other by an intervening gas segment. The outlet of the fitting 60 is connected to a horizontal mixing coil tubing 66.

As here shown, the outlet of the mixing coil is connected to the inlet of passage 14 of flow cell device 10 in which the air or gas segments are separated from the liquid segments as above described. A pump tube 68 is connected by a tube 70 to the outlet nipple 36 of passage 34 of the flow cell device 10 so that a flow of the treated sample liquid and vestiges of air, if any, is produced by the operation of pump 56, through the viewing chamber 22, passage 34, tube 70, and pump tube 68 to waste.

It will be understood that FIG. 4 illustrates the analysis apparatus only to the extent which is helpful to the explanation of the operation of the flow cell 10, and that various other modules might be included in the system, for example a heating bath, a dialyzer or a continuous filter, etc., as will be readily understood by those skilled in the art.

Considering the above description of the invention, it is to be noted that it has at least two aspects, namely (1) the flow cell with the integrated debubbler providing a unitary debubbler and a flow cell viewing chamber for the colimeter, and (2) an improved flow cell per se, considered apart from the debubbler inasmuch as the flow cell viewing chamber thus considered could have its inlet connected to a separate debubbler, for example as shown by the above mentioned U.S. Pat. No. 3,236,602 to Jack Isreeli. In the latter event the passage 14 would be omitted while outlet tube 34 would be retained noting that tube 34 corresponds to the outlet tube 34 of the flow cell of said Pat. No. 3,236,602. The liquid outlet of such separate debubbler would of course be connected to the inlet of the flow cell. However, I consider that the unitary device comprising therein the debubbler and the flow cell viewing chamber is superior in many ways to a flow cell with a structurally separate debubbler.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A colorimeter flow cell device comprising conduit means having a first passage for the flow therein of a stream of fluid comprising segments of at least a first fluid separated in the stream by segments of a second fluid having a different specific gravity than the specific gravity of said first fluid, said first passage having an inlet and an outlet and an intermediate opening between said inlet and said outlet, and a flow-through viewing chamber having an inlet adjacent to and in close fluid-flow communication with said intermediate opening and positioned with respect to said first passage such that at least some of said first fluid flows through said intermediate opening directly into said viewing chamber for analysis while said second fluid passes said opening and flows out of said first passage through said outlet, said viewing chamber having a light entrance and a light outlet defining a light path for the passage of light through said first fluid flowing in said viewing chamber which does not intercept said first passage.

2. A colorimeter flow cell device according to claim 1, wherein said viewing chamber extends transversely of said first passage and wherein the inlet of said viewing chamber is adjacent said intermediate opening in said first passage.

3. A colorimeter flow cell device according to claim 1, wherein said conduit means which has said first passage therein comprises a member also including a second passage extending through said member and forming said viewing chamber, and transparent parts secured to said member to form said light entrance and said light outlet of said flow-through viewing chamber.

4. A colorimeter flow cell device according to claim 3, wherein said member further includes an upwardly extending third passage in fluid-flow communication with said viewing chamber passage at a point remote from the inlet of said viewing chamber as an outlet for fluid passing through said viewing chamber.

5. A colorimeter flow cell device according to claim 1, wherein said viewing chamber has a longitudinal peripheral wall having a polished inner surface.

6. A colorimeter flow cell device according to claim 5, wherein said peripheral wall of the viewing chamber is formed of opaque material.

7. A colorimeter flow cell device according to claim 5, wherein said peripheral wall of the viewing chamber is formed of black material.

8. A colorimeter flow cell device according to claim 1, wherein the viewing chamber inlet is constituted by the intermediate opening of said first passage.

9. A colorimeter flow cell comprising a member formed of opaque material; said member having a first passage defining a flow-through viewing chamber for receiving fluid samples to be analyzed; said viewing chamber having a longitudinal peripheral wall extending between opposite surfaces of said member and having a polished inner surface defined by said opaque member; said viewing chamber having light transparent means sealing said viewing chamber and defining a light path through the flowing fluid in said viewing chamber; said member having a second passage extending between opposite surfaces of said member for the flow therein of a stream of fluid comprising segments of at least a first fluid separated by segments of a second fluid having a different specific gravity than said first fluid; said member further having a fluid input passage for connecting said viewing chamber and said second passage and a fluid output passage between said viewing chamber and one surface of said member; said second passage, said fluid input passage, and said fluid output passage each being located with respect to said viewing chamber so as not to intercept said light path; said flow-through viewing chamber being positioned with respect to said second passage such that at least some of said first fluid flows along said fluid input passage, said viewing chamber and said fluid output passage for analysis while said second fluid passes along said second passage; said second passage being positioned with respect to said viewing chamber to substantially minimize the length of said fluid inlet passage.

10. A colorimeter flow cell device according to claim 1, wherein said viewing chamber and said first passage are disposed substantially in transverse relation.

11. A colorimeter flow cell device according to claim 1, wherein said second fluid has a lower specific gravity than the specific gravity of said one fluid, and said flow-through viewing chamber is positioned below said first passage.

12. A colorimeter flow cell device according to claim 1, wherein said first passage intermediate said inlet and said outlet is linear.

13. A colorimeter flow cell device according to claim 1, wherein said viewing chamber is integrally formed with said conduit means to have said inlet in close fluid-flow communication with said intermediate opening in said fluid passage.

14. A colorimeter flow cell according to claim 9, wherein said transparent means seal said viewing chamber and said fluid input and said fluid output passages communicate with said viewing chamber, adjacent to said opposite walls, respectively, between which said first passage extends.

15. A colorimeter flow cell according to claim 14, wherein said second passage extends substantially transverse to said viewing chamber and between different opposite surfaces of said member.

References Cited

UNITED STATES PATENTS

| | | |
|---|---|---|
| 1,848,874 | 3/1932 | Fitzgerald. |
| 2,686,452 | 8/1954 | Bentley _____ 250—228 X |
| 3,080,789 | 3/1963 | Rosin et al. |
| 3,217,709 | 11/1965 | Schneider et al. |
| 3,236,602 | 2/1966 | Isreeli _____ 250—218 X |
| 3,345,910 | 10/1967 | Rosin et al. _____ 250—218 X |
| 3,381,571 | 5/1968 | Vallee et al. _____ 250—218 X |
| 3,394,253 | 7/1968 | Harrick et al. |

RONALD L. WILBERT, Primary Examiner

W. A. SKLAR, Assistant Examiner

U.S. Cl. X.R.

73—23.1; 250—218; 356—208, 246